W. E. HOSCH.
MEASURING MACHINE.
APPLICATION FILED AUG. 23, 1917.
1,403,164.
Patented Jan. 10, 1922.
3 SHEETS—SHEET 1.
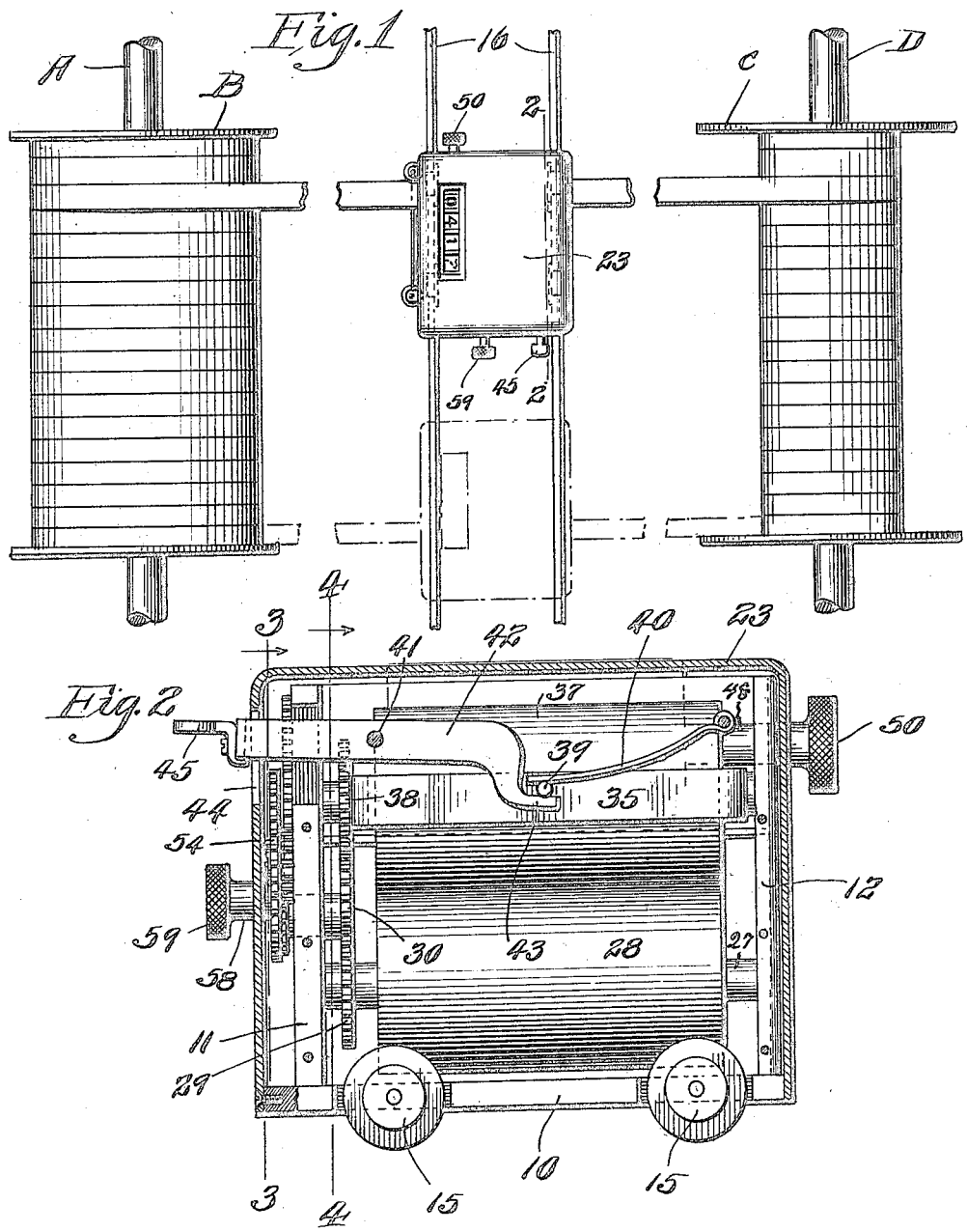
Inventor
Walter E. Hosch

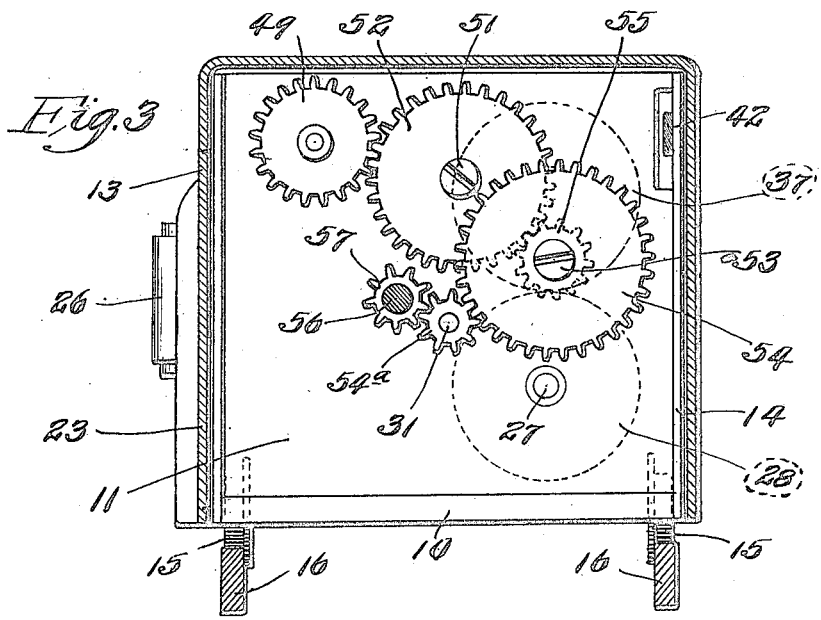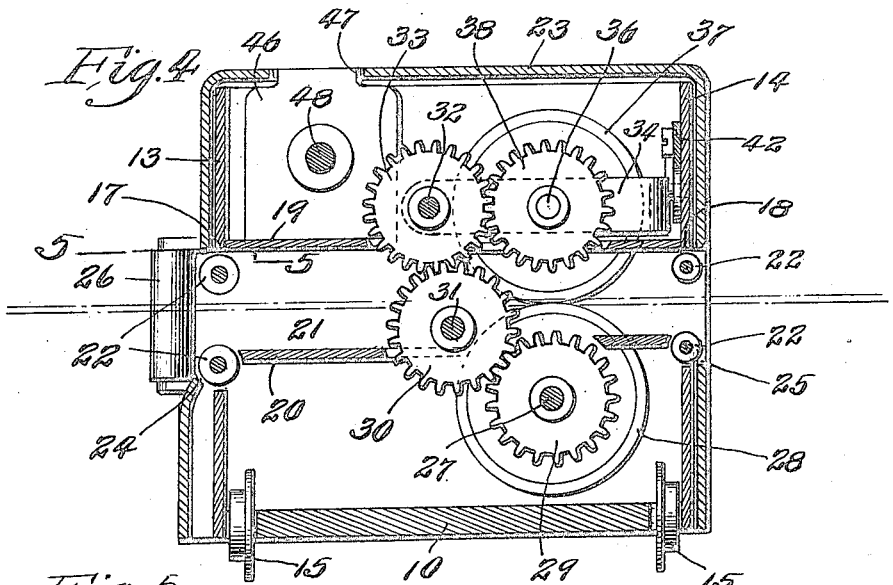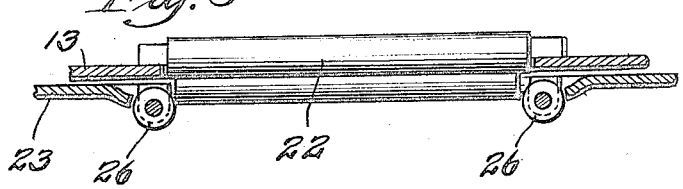

W. E. HOSCH.
MEASURING MACHINE.
APPLICATION FILED AUG. 23, 1917.

1,403,164.

Patented Jan. 10, 1922.
3 SHEETS—SHEET 3.

Inventor
Walter E. Hosch
By F. W. Cornwall, Atty.

UNITED STATES PATENT OFFICE.

WALTER E. HOSCH, OF ST. LOUIS, MISSOURI, ASSIGNOR TO THE MEASUREGRAPH COMPANY, OF ST. LOUIS, MISSOURI, A CORPORATION OF MISSOURI.

MEASURING MACHINE.

1,403,164.    Specification of Letters Patent.    Patented Jan. 10, 1922.

Application filed August 23, 1917. Serial No. 187,835.

*To all whom it may concern:*

Be it known that I, WALTER E. HOSCH, a citizen of the United States, residing at city of St. Louis, State of Missouri, have invented a certain new and useful Improvement in Measuring Machines, of which the following is a full, clear, and exact description, such as will enable others skilled in the art to which it appertains to make and use the same, reference being had to the accompanying drawings, forming part of this specification.

My invention relates to a measuring machine, the principal object of my invention being to provide a comparatively simple, compact and easily adjusted machine for automatically ascertaining and indicating or registering the lineal measurement of goods or material passed through the machine. The mechanism herein illustrated and described is particularly designed for the measurement of material such as rope, cordage, cables, binding material, or any flexible product which is comparatively narrow in width or small in cross sectional area and of considerable length.

In measuring the length of material in the form of a rope, cable or strip, such material is often measured while it is being unwound from a drum or spool. Under these circumstances the position of the winding off point on the spool or drum constantly changes; one of the objects of my invention is to provide a machine which will adapt its position automatically to the winding off point of the material as it winds off from the spool. In all types of measuring machines and particularly in a machine having the special objects of the machine described in the following specification, inaccuracies of measurements tend to arise by reason of the fact that the material being measured is sometimes pulled in such a direction that it exerts lateral pressure upon the presser roller instead of upon the measuring roller, and in this way a certain amount of slip may occur, by reason of which the measuring roller does not accurately indicate the true measurement. One of the objects of this invention is to provide a construction which will overcome this defect.

Further objects of the invention will appear hereinafter.

The invention consists in the novel features, and in the general combination of parts to be particularly described hereinafter, all of which contribute to produce a simple and efficient measure machine. A preferred embodiment of my invention will be particularly described in the following specification, while the broad scope of my invention will be pointed out in the appended claims.

In the drawings, Figure 1 is a plan view of a measuring machine of my improved construction, the same being mounted on a track or runway, the latter being positioned between a pair of reels or spools which carry the goods before and after the same has passed through the machine.

Figure 2 is an enlarged vertical section taken on the line 2—2 of Figure 1.

Figure 3 is a vertical section taken on the line 3—3 of Figure 2.

Figure 4 is a vertical section taken on the line 4—4 of Figure 2.

Figure 5 is a horizontal section taken on the line 5—5 of Figure 4.

Figure 6:
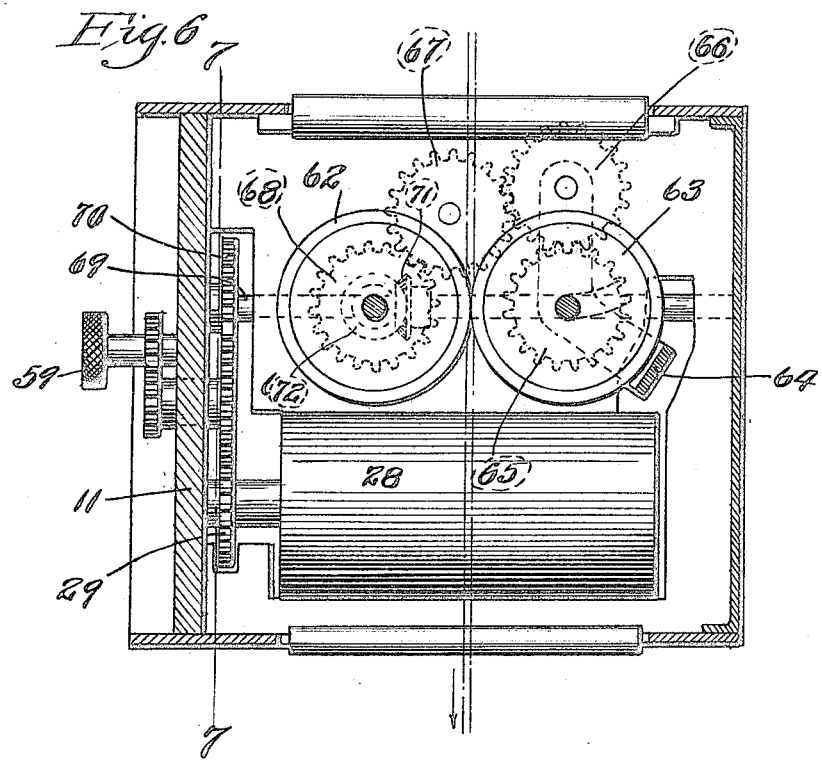
Figure 6 is a horizontal section taken through the body of a modified form of the machine.

Before proceeding to a detailed description of my invention, I desire to state, that according to my invention I provide a presser roller which is actually a counterpart of the measuring roller, so that in addition to performing its function as a presser roller, this roller has the proper diameter to operate as a measuring roller. Furthermore, where I employ two rollers engaging opposite sides of the cable or strip to be measured, I gear these rollers so that either or both of them can drive the indicating mechanism. Hence, if the strip or cable being measured, contacts more effectively with one roller than the other, this will not cause any inaccuracy of measurement because the roller which is receiving the pressure will advance the indicating mechanism. In measuring the length of round cords or cables, I prefer to employ more than two measuring rollers, and I prefer to employ three or four rollers disposed around a central point through which the cable may pass, the rollers operating to limit the lateral movement of the cable in any direction. Where the machine is used for measuring the length of a strip or cable being unwound from a drum, I provide means for guiding the entire measuring machine, so that it can move to and fro along a guide which is disposed substantially parallel with the axis of the drum through which the strip or cable is unwound. I shall now describe an embodiment of my invention to accomplish these purposes.

Referring by numerals to the accompanying drawings, and particularly to the construction illustrated in Figures 1 to 5, inclusive, 10 designates a base plate upon upon which is supported upright end plates or walls 11 and 12, and a pair of side walls 13 and 14, these parts being secured to each other in any suitable manner and constituting the main frame of the machine.

Where my improved machine is utilized for measuring material which is being unwound from a large spool or drum, the base plate 10 of the measuring machine is mounted on suitable guiding means extending parallel with the axis of the spool. For this purpose it is provided with pairs of rolling supports, preferably small flanged wheels 15, the same being mounted to travel a guide formed of the rails 16. These rails are arranged adjacent to and parallel with the shaft A on which is mounted the spool or drum B which carries the material to be measured. The spool or drum C which receives the material after the same has passed through the machine, is carried by a shaft D, the latter being disposed substantially parallel with the rails 16 and on the opposite side thereof from the shaft A. When this arrangement is provided, shaft D carrying drum C is rotated and the material being measured unwinds from the drum or spool B and passes through the machine which latter travels freely in both directions upon the rails 16, thus accommodating itself to the position of the web or strand of material as the same unwinds from drum B. Formed in the central portions of the side walls 13 and 14 are horizontally disposed openings 17 and 18, Fig. 4, respectively, and secured to the side and end walls immediately above and below these openings are horizontally disposed plates 19 and 20. The space 21 between these partitions forms the opening in the machine through which passes the goods or materials being measured. Suitable rollers 22 are mounted for operation above and below both ends of the opening 21, the same serving as roller bearings which eliminate friction of the material during its passage through the machine. A suitable housing 23, preferably of sheet metal, encloses the frame work of the machine, said housing being secured to base plate 10 in any suitable manner and formed in the side walls of this housing are openings 24 and 25, Fig. 4, the same coinciding respectively with the openings 17 and 18. Mounted for rotation in suitable bearings at the ends of the opening 24 are vertically disposed rollers 26, the same serving as roller bearings which cooperate with rollers 22 at the inlet end of the opening 21 to guide the material as it passes into said opening and through the machine. A shaft 27 is journaled in the end walls of plates 11 and 12 below the horizontally disposed plate 20 and carried by this shaft is a measuring roller 28 having a fixed or definite circumference. This roller, or the outer shell thereof, may be formed of rubber or suitable composition so that its peripheral surface will engage the material passing through the machine with considerable friction, thereby tending to reduce and eliminate slipping of said material. The shaft 27 is mounted so that the upper portion of the roller 28 operates through an opening formed in the lower plate or partition 20. Fixed on shaft 27 inside and adjacent to the end plate 11 is a pinion 29, the same meshing with a pinion 30 of equal size, the latter being fixed on a shaft 31 which is journaled in end plate 11. Journaled in suitable bearings in the plates 11 and 12 above the central portion of the plate 19 is a shaft 32 and loosely mounted thereon, near plate 11, is a pinion 33, the same being equal in size to and meshing with pinion 30. Loosely mounted on shaft 32, near the ends thereof, are the ends of a frame, the same comprising a pair of end members 34 Fig. 4, and a side member 35, Fig. 2, said side member lying immediately adjacent to side wall 14. Journaled in the end members 34 of this frame is a shaft 36 and carried thereby is a second measuring roller 37, the same being identical in size and construction with the measuring roller 28. The lower portion of this measuring roller 37 operates through a suitable opening formed in plate 19 and normally the periphery of said measuring roller is in direct contact with the peripheral surface of roller 28. Fixed to shaft 36, adjacent to plate 11, is a pinion 38 which is of the same diameter as and meshes with pinion 33.

I provide means for resiliently pressing the measuring rollers against the side of the rope or strip being measured. For this purpose, projecting outwardly from the central portion of member 35 is a pin 39 Fig. 2 upon which bears the free end of a spring 40, the opposite end being fixed to side wall or plate 14. By virtue of this construction, measuring roller 37 bears downwardly against companion roller 28 or upon the interposed material with yielding pressure with the result that the measuring rollers grip the strip, and any movement of the material interposed between said rollers will impart movement to one roller or the other, and by reason of the fact that said rollers are connected by the pinions 29, 30, 33, and 38, Fig. 4, said measuring rollers will move simultaneously and with the same peripheral speed. Fulcrumed on a pin 41 which is seated in the upper portion of plate 14 is a lever 42, the inner end of which is bent downwardly and formed into a finger 43, the same being positioned directly beneath pin 39. The opposite end of this lever projects through an opening 44 formed in the housing 23, said outer end carrying a thumb or finger bearing plate 45. This lever provides means for lifting the frame carrying measuring roller 37, such operation being necessary when the end of a piece of material is inserted between the measuring rolls at the beginning of the measuring operation. After introducing the fabric the rollers should be permitted to come together. Mounted on plate 19 is a housing 46 which carries a suitable counting mechanism, preferably of that type which includes a series of disks, the periphery of each of which bears the numbers from zero to 9, said disks being actuated in sequence and the upper portion of this housing projects through a suitable opening 47 in the top of housing 23 in order that the numbers on the disks of the counting mechanism can be readily observed. One end of shaft 48 of this counting and indicating device extends through a bearing in plate 11 and carries a pinion 49, Fig. 3. The opposite end of this shaft 48 extends through plate 12 and the corresponding end wall of housing 23 and carries a disk 50, the same having a milled edge. Journaled on a pin 51 which is seated in the plate 11 and meshing with pinions 49 is a gear 52. Seated in plate 11 is a pin 53 upon which is mounted for rotation a comparatively large gear 54 and fixed thereto is a small pinion 55, the latter meshing with gear 52. The gear 54 meshes with a pinion 54ª, the latter being fixed on the end of shaft 31 which projects through plate 11. Loosely mounted on a pin 56 which is seated in plate 11 is a pinion 57, the same meshing with pinion 54ª and connected to this pinion in any suitable manner is a short sleeve 58, Fig. 2, which extends outwardly through the corresponding end wall of the housing 23 and carries at its outer end a disk 59 having a milled edge. The operation of my improved measuring machine is as follows:

Measuring roller 37 is moved upwardly away from companion measuring roller 28 by bearing downwardly on thumb or finger plate 45, which action forces the frame carrying said roller 37 upwardly against the resistance offered by spring 40 and the end of the material to be measured is inserted through the front end of the opening 21, being that end of the opening shown at the left of Fig. 4, and positioned between the rollers 28 and 37. The material is now pulled outwardly through the rear end of opening 21 and wound upon a suitable support, such as the spool C, and as this operation continues, the measuring rollers 28 and 37 will operate in unison by virtue of the fact that they frictionally engage the material passing between them, and further by reason of the fact that said rollers are geared together by the pinions 29, 30, 33, and 38, Fig. 4. In the event that the diameter or cross sectional area of the material passing through the machine varies, the roller 37 will automatically adjust itself to the varying thickness of said material, but such action will in no wise affect the synchronous movement of the measuring rollers by virtue of the fact that the axis of roller 37 or the center of shaft 36 at all times retains the same position or distance away from the axis of shaft 32, such arrangement being brought about by the pivoting or mounting of the frame carrying measuring roller 37 upon said shaft 32.

The rotary motion of the lower measuring roller 28 is transmitted through pinions 29 and 30 to shaft 31, and thence through pinions 54ª, 54, 55, 52, and 49 Fig. 3 to shaft 48 which actuates the numbered disks in the counting device. Thus as the material is drawn through the machine and the measuring rollers are operated, the movement thereof is transmitted to and accurately registered upon the counting mechanism and the operator or attendant can at all times readily ascertain the lineal measurement of the piece of goods which has passed through the machine. In the event that the measuring machine is used on the tracks 16 between a pair of spools or drums, said machine will travel backwardly and forwardly upon the track rails, thereby automatically adjusting itself to the action of the piece of goods in unwinding form the spool B and winding onto spool C, and maintaining the direction of pull of the strip substantially at right angles to the axes of the measuring rollers. This insures accuracy of measurement.

As heretofore stated, the rollers at the ends of the opening 21 serve to eliminate friction between the strip of material being measured and the walls of the device around the opening 21. The milled disk 50 on the end of shaft 48 provides means for setting all of the numbered disks of the counting device back to zero after a piece of goods has been measured and the milled disk 59 provides means for imparting movement to the train of gearing including pinions 57, 54ª, 54, 55, 52, and 49 to shift the position of the units wheel of the counting device so that the numbers thereon will register with the corresponding numbers on the disks of higher denomination.

Figure 7:
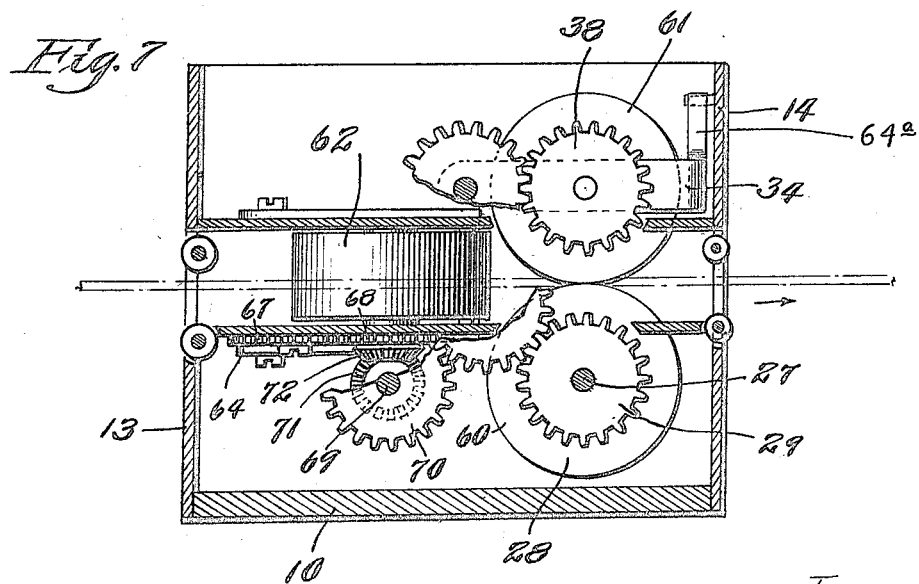
Figure 7 is a vertical section taken approximately on the line 7—7 of Figure 6.

The form of measuring machine illustrated in Figures 6 and 7 is particularly designed for measuring rope, cables, cordage, or any material which is approximately round in cross section, said machine including a plurality of measuring rollers disposed so as to form an opening through which the cable passes, so that the measuring rollers limit the lateral movement of the cable in any direction. These rollers are all geared to drive the same indicating mechanism. For this purpose, I provide two pairs of measuring rollers, one pair having horizontally disposed axes as in the structure herein described and the other pair being vertically disposed and arranged immediately adjacent to the horizontally disposed pair. In this form of device, 60 and 61 designate the horizontally disposed pair of rollers, the same being geared to operate in unison, the same as in the structure heretofore described, and arranged immediately in front of this horizontally disposed pair of rollers and to the sides of the opening through which the material travels is a pair of vertically disposed rollers 62 and 63. The shaft or trunnions of roller 63 are mounted in a swinging frame 64, normally under the pressure of a spring 64$^a$, Fig. 7, so that said roller 63 can move toward and away from its companion roller 62 and said rollers 62 and 63 are geared to operate in unison by a train of pinions 65, 66, 67, and 68, the latter being fixed on the shaft carrying roller 62. Journaled in the end plates of this form of machine is a shaft 69 and fixed thereon near the end is a pinion 70 which meshes with one of the pinions forming the train of gearing between the measuring rollers 60 and 61. Fixed on this shaft 69 is a beveled pinion 71, the same meshing with a corresponding beveled pinion 72, the latter being fixed on the lower end of the shaft which carries the measuring roller 62 and pinion 68. By virtue of this construction, the two pairs of measuring rollers are geared together so that all rollers operate in unison and as there are four rollers, a rope, cable, or the like, passing through the machine and through the opening formed between the rollers is engaged at four different points, thus insuring positive and accurate operation of the machine. It will be understood, of course, that the train of gears shown in Fig. 3 for operating the counting mechanism will be associated in the same manner with the rollers 60 and 61. Also I have not considered it necessary to illustrate, in connection with this modified construction, means for separating the rollers to permit passing the material to be measured through them, as Fig. 2 shows means for separating rollers 28 and 37, which are identical with rollers 60 and 61, and it will be obvious that the same means may be employed for separating the latter rollers and the rollers 62 and 63, the roller 63 being mounted in a frame in the same manner as the rollers 61 and 37.

A measuring machine of my improved construction is comparatively simple, is entirely automatic in operation, is very compact, and is very effective for accurately obtaining the lineal measurement of goods such as rope, cable, cordage, binding material, tape, or any material which is in the form of narrow strips or sections.

It will be noted that in the form of the invention embodied in the construction illustrated in Figures 6 and 7 it is merely necessary that certain of the rollers shall be mounted to rotate in a different plane from the other rollers; at the same time, they should be disposed so that their peripheries touch the circumferential face of the cable at points intermediate the points of contact of the other rollers with the face of the cable.

I claim:

1. In a machine of the kind described, the combination of a measuring roller mounted to rotate on a fixed axis, a roller frame mounted to swing about a fixed axis, a second measuring roller carried by said roller frame, means for yieldingly pressing the second measuring roller toward the first named measuring roller, and a gear train connecting said rollers to rotate in unison with each other and including a gear wheel on the axis of the said roller frame, whereby the driving connection through said gear train is maintained if said second measuring roller moves toward or recedes from the first named measuring roller, indicating mechanism and means for actuating the same by said rollers.

2. In a measuring machine of the kind described, the combination of a measuring roller mounted to rotate about a fixed axis, a roller frame mounted to swing about a fixed axis, a second measuring roller mounted to rotate in said roller frame, means for yieldingly pressing said roller frame toward the first named measuring roller to enable the measuring rollers to grip a strip passing therebetween, a gear wheel rigid with the second named measuring roller and co-axial therewith, a gear wheel rotatably mounted on the axis of said roller frame meshing with said last named gear wheel, a gear wheel meshing with the gear wheel that rotates on the axis of the roller frame, and a gear wheel meshing with the last named gear wheel and rigid with the first named roller, indicating mechanism, and means for driving the same from one of said measuring rollers, said gear wheels operating to enable the other measuring roller to drive the indicating mechanism.

3. In a machine for measuring the length of a cable, the combination of a plurality of measuring rollers disposed around the circumference of the cable, certain of the rollers being mounted to rotate in a different plane from the other rollers, and disposed so that their peripheries touch the circumferential face of the cable at points intermediate the circumferential points of contact of the other rollers therewith, means for resiliently pressing the measuring rollers against the sides of the cable, and an indicating mechanism actuated by all of the rollers.

4. In a machine for measuring a length of cable, the combination of a pair of oppositely disposed measuring rollers between which the cable passes, means for resiliently pressing the measuring rollers against the side of the cable, a second pair of measuring rollers mounted with their axes in a plane substantially at right angles to the axes of the first named measuring rollers, means for resiliently pressing said second named rollers against the side of the cable, an indicating mechanism actuated by all of the rollers, and means for actuating the same from all of the rollers.

In testimony whereof, I hereunto affix my signature in the presence of two witnesses, this 21st day of August, 1917.

WALTER E. HOSCH.

Witnesses:
 M. P. SMITH,
 LAURA MEYER.